(12) United States Patent
Suzuki et al.

(10) Patent No.: US 11,125,272 B2
(45) Date of Patent: Sep. 21, 2021

(54) THROTTLE UNIT AND A STATIC PRESSURE BEARING DEVICE EQUIPPED WITH THE THROTTLE UNIT, AND A METHOD OF MANUFACTURING A GROOVED BLOCK

(71) Applicant: FANUC CORPORATION, Yamanashi (JP)

(72) Inventors: Toyoaki Suzuki, Yamanashi (JP); Masahiro Murota, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 129 days.

(21) Appl. No.: 16/688,303

(22) Filed: Nov. 19, 2019

(65) Prior Publication Data

US 2020/0080592 A1    Mar. 12, 2020

Related U.S. Application Data

(62) Division of application No. 15/478,445, filed on Apr. 4, 2017, now abandoned.

(30) Foreign Application Priority Data

Apr. 5, 2016 (JP) ................. 2016-076039

(51) Int. Cl.
*F16C 32/06* (2006.01)
*F16C 29/02* (2006.01)

(52) U.S. Cl.
CPC ........ *F16C 32/0622* (2013.01); *F16C 29/025* (2013.01); *F16C 32/0625* (2013.01); *F16C 32/0655* (2013.01); *F16C 32/0659* (2013.01); *F16C 2220/60* (2013.01); *F16C 2240/42* (2013.01); *F16C 2322/39* (2013.01)

(58) Field of Classification Search
CPC .............. F16C 2220/60; F16C 2240/42; F16C 29/025; F16C 32/0622; F16C 32/0625; F16C 32/0655; F16C 32/0659
See application file for complete search history.

(56) References Cited

U.S. PATENT DOCUMENTS 3,782,791 A * 1/1974 Neumann ........... F16C 32/0659
384/116
3,801,165 A * 4/1974 Lombard .............. F16C 29/025
384/12

(Continued)

FOREIGN PATENT DOCUMENTS

DE  11 2006 004 184 T5   10/2009
JP       S54-24318 A      2/1979

(Continued)

*Primary Examiner* — Jacob J Cigna
(74) *Attorney, Agent, or Firm* — Hauptman Ham, LLP

(57) ABSTRACT

A throttle unit is equipped with a grooved block including at least one minute groove formed on a plane surface, and an opposite block having a plane surface which is opposite to the minute groove. The grooved block and the opposite block are detachably joined so as to be opposite to each other. A throttle fluid path is formed by the minute groove and the plane surface of the opposite block. At least one surface of each of the minute groove is constituted by a curved surface or an inclined surface that is inclined with respect to the plane surface of the grooved block.

11 Claims, 12 Drawing Sheets

(56) References Cited

U.S. PATENT DOCUMENTS

| | | | |
|---|---|---|---|
| 3,902,647 A * | 9/1975 | Neumann | F16C 29/025 226/97.3 |
| 5,407,280 A | 4/1995 | Heinzl et al. | |
| 6,164,827 A * | 12/2000 | Eitzenberger | F16C 29/025 384/100 |
| 8,608,382 B2 * | 12/2013 | Uchimura | F16C 32/0614 384/12 |
| 9,506,498 B2 * | 11/2016 | Hadarik | F16C 29/025 |
| 2002/0153046 A1 | 10/2002 | Dantsker et al. | |
| 2004/0013545 A1 * | 1/2004 | Brown | F16K 99/0015 417/413.3 |
| 2010/0177994 A1 | 7/2010 | Rudy et al. | |
| 2012/0301060 A1 * | 11/2012 | Uchimura | F16C 29/025 384/12 |
| 2013/0181558 A1 * | 7/2013 | Kodama | F16C 33/107 310/90 |
| 2014/0318365 A1 * | 10/2014 | Muhle | F04B 39/126 92/153 |
| 2015/0276368 A1 * | 10/2015 | Hadarik | F16C 29/025 73/788 |
| 2019/0035689 A1 * | 1/2019 | Yamamoto | H01L 21/67265 |

FOREIGN PATENT DOCUMENTS

| | | |
|---|---|---|
| JP | 2005-37623 A | 2/2005 |
| JP | 2006-29412 A | 2/2006 |
| JP | 2006-153141 A | 6/2006 |
| JP | 2006-266358 A | 10/2006 |
| TW | I295216 B | 4/2008 |
| TW | I334968 B | 12/2010 |
| TW | I537428 B | 6/2016 |

* cited by examiner

THROTTLE UNIT AND A STATIC PRESSURE BEARING DEVICE EQUIPPED WITH THE THROTTLE UNIT, AND A METHOD OF MANUFACTURING A GROOVED BLOCK

CROSS-REFERENCE TO RELATED APPLICATION

This application is a divisional of U.S. application Ser. No. 15/478,445 filed on Apr. 4, 2017, and based upon and claims the benefit of priority from Japanese Patent Application No. 2016-076039 filed on Apr. 5, 2016, the contents of which are incorporated herein by reference.

BACKGROUND OF THE INVENTION

Field of the Invention

The present invention relates to a throttle unit and a static pressure bearing device equipped with the throttle unit, and a method of manufacturing a grooved block.

Description of the Related Art

In machine tools, as a guide device for a table having a linear motion axis or a rotational axis, static pressure bearings are used. In a static pressure bearing, in a case of a structure with a linear motion axis, for example, a static pressure pocket is formed on a bearing surface of a slide or a guide, and a working fluid such as oil or air is supplied to the static pressure pocket. The slide floats above the guide as a fixed portion by the static pressure of the working fluid, whereby the slide can be moved along the guide in a non-contact manner.

Generally, to obtain rigidity of the static pressure bearing, a throttle unit (pipe resistance device) needs to be disposed in the middle of piping for supplying the working fluid from a pump to the static pressure pocket, for restricting the flow rate of the working fluid supplied from the pump. The pipe resistance, i.e., restriction strength (degree of restriction) increases as the cross sectional area of minute fluid path (restriction path) becomes smaller or as the length thereof becomes longer. The optimal restriction strength is obtained when the pressure of the working fluid in the static pressure pocket is 0.5 times as large as the pressure from the pump, and at the same time the largest rigidity of the bearing can be achieved.

General throttle units include a unit using a thin tube like an injection needle (hereinafter referred to as a "needle throttle unit"), and a unit using a minute fluid path for restriction between a male thread and a female thread (hereinafter referred to as a "screw throttle unit"). The screw throttle unit is disclosed, for example, in Japanese Laid-Open Patent Publication No. 11-210905.

Problems of the needle throttle unit include the following points: the man hours for assembling the unit are large since the structure for incorporating the needle is complicated; the individual differences in the restriction strength are large since the variety of inner diameter errors of the respective needles is likely to affect the restriction strength; the unit has low reliability since the needle tends to fall off, and thus the restriction strength may change over time; due to a limit to the needle thinness, a thin needle is required to be long and have a special shape, for securing a certain degree or more of the restriction strength, so that the cost is high for preparing such a needle; and it is difficult to clean the unit when the needle is clogged with foreign material or the like.

Problems of the screw throttle unit include the following points: The number of parts or components is large and the structure of the unit is complicated, so that man hours for assembling are large; Precise adjustment is indispensable and the individual differences in the restriction strength become large depending on the adjustment state; The restriction strength may change in time due to looseness of the screw; The cost is high because of the large number of components; And it is difficult to clean the unit when the unit is clogged with foreign material or the like.

For overcoming part of the above problems, there is a throttle unit (hereinafter referred to as a "groove throttle unit") in which a block with a plane surface having a groove thereon and another block with a plane surface are overlapped with each other to form a minute fluid path for realizing restriction. In a groove throttle unit disclosed in Japanese Laid-Open Patent Publication No. 2006-266358, a minute fluid path has a simple cross sectional shape of a substantial square, and the minute fluid path is constituted by a simple component. Thus, there is an advantageous effect that the restriction strength is not changed over time after assembly, the change of the restriction strength being caused by the falling-off or displacement of the components in the case of a needle throttle unit or a screw throttle unit.

Further, the throttle unit described in Japanese Laid-Open Patent Publication No. 2006-266358 is capable of changing the restriction strength stepwise by lengthening the fluid path (path for restriction) which is achieved by stacking the blocks having grooves machined on plane surfaces to form the minute fluid paths. Thus, the individual differences in the restriction strength can be suppressed within a certain range.

SUMMARY OF THE INVENTION

As described above, the restriction strength is increased, as the sectional area of a minute fluid path (a path for restriction) becomes smaller or the minute fluid path becomes longer. Generally, the resistance of a fluid path is proportional to a fluid path length, and inversely proportional to the fourth power of a fluid path diameter (the second power of a sectional area) of the fluid path. That is, a groove width and a groove depth which define a sectional area, particularly the formation of the groove depth which corresponds to the aforementioned fluid path diameter, require further accuracy.

As described, the groove depth is an important factor that influences the restriction strength. The groove disclosed in Japanese Laid-Open Patent Publication No. 2006-266358 has a cross section of a substantial square. Thus, by a general method as a means for inspecting the groove depth, in which the groove is observed from above with a microscope, even though the groove width may be measured, the groove depth, which is defined in the depth direction in the view field of the microscope, cannot be measured.

When a shape of the groove is formed by machining, the groove depth depends on a machine accuracy of the machine tool. In a case of using a machine tool, the groove depth generally includes an error of about 50 μm with respect to a target value. Therefore, even when a substantially square cross section having a 100 μm groove depth is to be obtained, the groove depth after machining has an error of ±25%, from 75 μm to 125 μm. Thus, a single groove itself has a significantly large individual difference of ±56% in the restriction strength.

In order to decrease the aforementioned individual difference, it is necessary to reduce the influence of the error of about 50 μm included in the groove depth. Thus, it is necessary to lengthen the groove width and the groove depth to enlarge a cross sectional area, and further it is necessary to lengthen the groove length. For example, if the target value of the groove depth for a substantially square cross section is 1000 μm (1 mm), which is ten times as large as the aforementioned value, the error included in the machined groove depth is reduced to one tenth thereof, i.e., ±2.5%. Then, the single groove's individual difference in the restriction strength can be suppressed to ±5%. However, in order to secure restriction strength similar to the conventional one, the fluid path length needs to be 100 times as long as that of the conventional one.

According to Japanese Laid-Open Patent Publication No. 2006-266358, as a means for lengthening the groove, a plurality of lines (grooves) are formed on one plane surface of the block, or an additional block with a groove is provided. However, since the groove shape to be machined is complicated, the cost becomes high due to increased man hours, and the restriction strength may be changed over time due to the clogging with foreign material. Further, it is expected that cleaning such a groove is difficult. Also, the number of components becomes large, undesirably resulting in high cost and a large size of the unit.

Factors which affect the machine accuracy of a machine tool include thermal displacement by the influence of atmospheric temperature around the machine tool. If a groove depth is measured after machining, it is possible to machine the groove more accurately by adding some correction (thermal displacement correction) to the machine tool. Thus, it is extremely important to measure the groove depth after machining.

It is preferable for a throttle unit used in a static pressure bearing to have a simple structure, minimize the individual differences in the restriction strength, have constant restriction strength without change over time, realize a low cost and a small size, and achieve easy cleaning. However, no such a throttle unit that satisfies all the aforementioned demands has been proposed so far. Further, like the minute groove disclosed in Japanese Laid-Open Patent Publication No. 2006-266358, if the cross section of the groove has a substantially square shape, the shape observed from above is the same even when the groove depth of the cross sectional shape varies due to the machine accuracy of the machine tool. Therefore, the groove depth, which is defined in the depth direction in the view field of the microscope, cannot be measured, and also it is difficult to machine the groove accurately.

The present invention has been devised taking into consideration the aforementioned problems, and has the object of providing a throttle unit and a static pressure bearing device equipped with the throttle unit, and a method of manufacturing a grooved block, which make it possible to ensure accurate groove machining and obtain an accurate groove shape, by enabling the groove depth as well as the groove width to be measured according to a general method in which the groove is observed from above with a microscope.

In order to achieve the above object, the present invention is characterized by a throttle unit in which a working fluid is introduced from at least one supply hole, the introduced working fluid flows in a minute throttle fluid path, and the working fluid which has passed through the throttle fluid path is discharged from at least one discharge hole, the unit comprising a grooved block including at least one minute groove on a plane surface, an opposite block including a plane surface that is opposite to the minute groove, wherein the grooved block and the opposite block are opposite to each other and detachably joined to each other, the throttle fluid path is formed by the minute groove and the plane surface of the opposite block, at least one surface of the minute groove is constituted by a curved surface or an inclined surface that is inclined with respect to the plane surface of the grooved block.

With the throttle unit according to the present invention, in which above configuration is adopted, the cross section of the minute groove has a shape such as a triangle, a trapezoid, a polygon (except for a substantial rectangle), an arc, or a combination thereof. Thus, the groove depth as well as the groove width of the minute groove can be measured by a general method in which the groove is observed with a microscope from the direction perpendicular to the plane. Since the groove depth of the minute groove can be measured, more accurate machining can be achieved by correcting the machining device (machine tool) based on the machining result, and an accurate groove shape can be obtained.

In the throttle unit, the minute groove may extend linearly from the supply hole to the discharge hole.

With this structure, the minute groove can be manufactured (by cutting) easily, in contrast to a conventional polygonal-chain minute groove constituted by a plurality of linear portions. Thus, it is possible to prevent the corners (bent portions) of the minute groove from being clogged with the foreign material.

In the throttle unit, a plurality of the minute grooves may be arranged on a same line through the supply hole.

With this structure, at the time of machining the minute grooves, a groove is machined only once across the supply hole. Then, the groove divided by the supply hole can be used as independent minute grooves. Since the plurality of minute grooves are formed in a single machining path, it is possible to reduce man hours for the machining.

In the throttle unit, a plurality of the throttle fluid paths may be connected to the single supply hole. Also, the discharge holes, which are independent from each other, may communicate with the plurality of throttle fluid paths, and the working fluid that is supplied to the single supply hole may branches into the plurality of throttle fluid paths, and be discharged from the plurality of discharge holes.

With this structure, the number of throttle units provided in the static pressure bearing device can be reduced. Thus, it is possible to lower the cost, simplify the structure, and omit some piping. Accordingly, since additional parts for changing restriction strength are unnecessary, it is possible to minimize the number of parts, the portions to be sealed, and piping. Further, the structure is simple, and the man hours for machining and assembling are small. Also, individual differences in the restriction strength are small, the cost is lowered, and it is easy to clean the unit.

In the throttle unit, either the grooved block or the opposite block may function as a slide component, a guide component, or another throttle unit component.

In accordance with this feature, it is expected that the structure can be simplified, the number of parts can be reduced, the installation space can be saved, and some piping can be omitted, and the like, since the throttle unit can be constituted substantially by one component.

In the throttle unit, a width and a depth of the minute groove may be continuously changed, at least along part of a fluid path extending from the supply hole to the discharge hole.

With this structure, even if foreign material somewhat clogs the minute groove, it is possible to easily gather the foreign material at a small cross sectional portion of the minute groove. Thus, the portion clogged with foreign material is easily confirmed at the time of cleaning operation for the disassembled device, and the foreign material can be removed efficiently.

In the throttle unit, a minimum depth of a fluid path in the minute groove from the supply hole to the discharge hole may be 1000 μm or less.

Further, the present invention is characterized by a static pressure bearing device in a structure with a linear motion axis or a structure with a rotation axis, in which a static pressure bearing is constituted between a movable portion and a fixed portion of the structure with the linear motion axis or the structure with the rotation axis, the device comprising, a fluid supply line configured to supply a working fluid to a static pressure pocket formed in the movable portion or the fixed portion; and a throttle unit provided in the fluid supply line, wherein the throttle unit comprises any one of the above-described throttle units.

Still further, the present invention is characterized by a method of manufacturing a grooved block that includes at least one minute groove on a plane surface, wherein the grooved block is a component of a throttle unit, a working fluid is introduced from at least one supply hole, the introduced working fluid flows in a minute throttle fluid path, and the working fluid which has passed through the throttle fluid path is discharged from at least one discharge hole, wherein the throttle unit comprises the grooved block, and an opposite block including a plane surface that is opposite to the minute groove, the grooved block and the opposite block are opposite to each other and detachably joined to each other, and the throttle fluid path is formed by the minute groove and the plane surface of the opposite block, the method comprising a cutting step of cutting a plane surface of a workpiece block to form the minute groove, at least one surface of the minute groove being constituted by a curved surface or a inclined surface that is inclined with respect to the plane surface of the workpiece block, a depth calculating step of calculating a groove depth of the minute groove that has been formed in the machining step, observing the minute groove (25, 25A through 25D) with a microscope from a direction perpendicular to the surface of the workpiece block, and a correcting step of making a correction of a machining device that performs the cutting, based on the calculated groove depth.

With the throttle unit according to the present invention, it is possible to ensure accurate groove machining and obtain an accurate groove shape, by enabling the groove depth as well as the groove width to be measured in a general method in which the minute groove is observed from above with a microscope. Therefore, by installing the throttle unit, it is possible to reduce the weight of parts, realize compact structure, reduce the cost by decreasing the number of parts and manufacturing steps, achieve high reliability, and improve maintainability due to easy disassembly and cleaning.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of a throttle unit and a static pressure bearing device having the throttle unit, and a method of manufacturing a grooved block according to the present invention will be described below with reference to the accompanying drawings.

Figure 1:
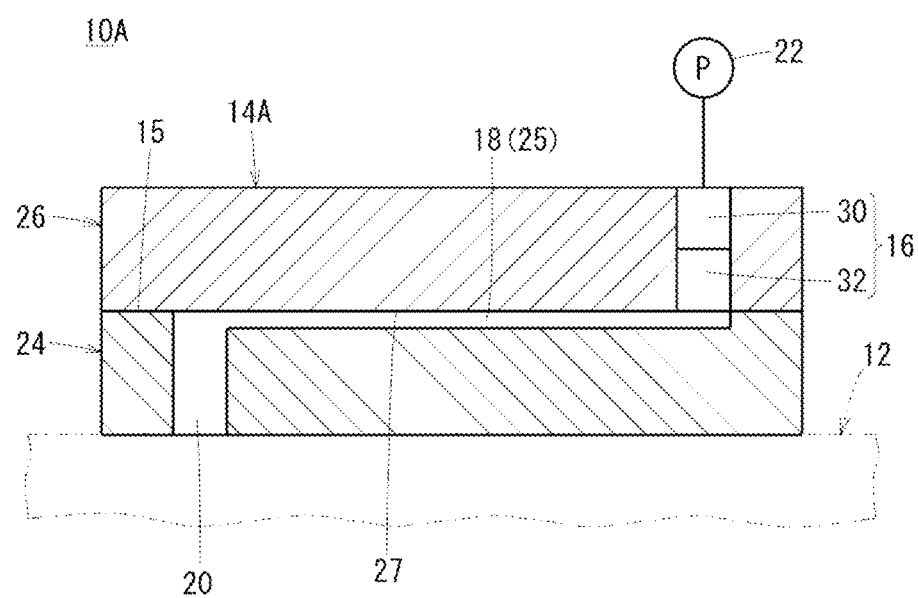
FIG. 1 is a schematic cross sectional view of a static pressure bearing device according to an embodiment of the present invention.

A static pressure bearing device 10A shown in FIG. 1 is equipped with a bearing unit 12, and a throttle unit 14A attached to the bearing unit 12. Though the detailed structure is not shown, the bearing unit 12 is equipped with a structure with a linear motion axis, in which a guide as a fixed portion and a slide as a movable portion are provided. A plurality of static pressure pockets are formed on a bearing surface of the slide or the guide. When a working fluid such as air is supplied to the static pressure pockets, the slide floats above the guide by the static pressure of the working fluid and can move along the guide in a non-contact manner. The bearing unit 12 may have a structure with a rotary axis.

Figure 2:
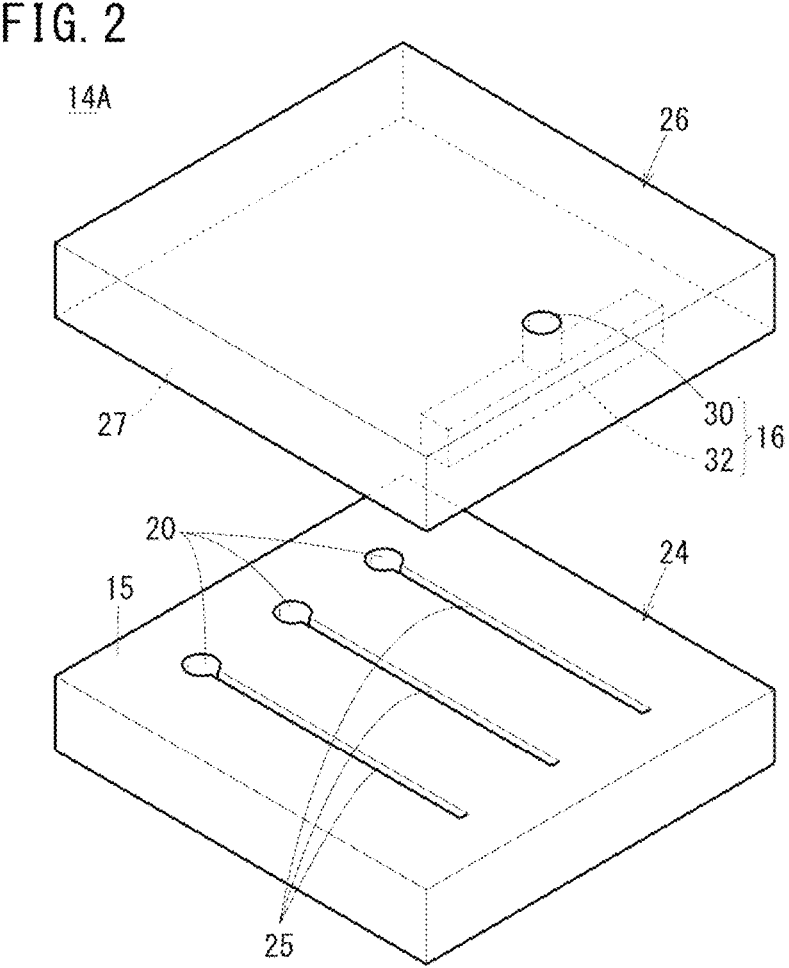
FIG. 2 is an exploded perspective view of a throttle unit of the static pressure bearing device shown in FIG. 1.

The throttle unit 14A is attached to the slide or guide of the bearing unit 12. As shown in FIGS. 1 and 2, the throttle unit 14A is equipped with a supply hole 16 through which the working fluid is introduced, throttle fluid paths 18 for restricting the flow rate of the introduced working fluid, and discharge holes 20 for discharging the working fluid which has passed through the throttle fluid paths 18. To the supply hole 16, a pump 22 as a supply source of the working fluid is connected through a fluid path supply line. The discharge holes 20 communicate with the static pressure pockets of the bearing unit 12.

More specifically, the throttle unit 14A is equipped with a grooved block 24 including a plane surface 15 and minute grooves 25 formed on the plane surface 15, and an opposite block 26 detachably attached to the grooved block 24 and having a plane surface 27 which is opposite to or face toward the minute grooves 25. The grooved block 24 and the opposite block 26 are joined so as to be opposite to each other in an assembled state. The throttle fluid paths 18 are formed by the minute grooves 25 and the plane surface 27 of the opposite block 26.

The supply hole 16 is formed in the opposite block 26. The supply hole 16 penetrates through the opposite block 26 in the thickness direction. More specifically, the supply hole 16 has an introduction portion 30, and a diffusion portion 32 that is formed on the downstream side (grooved block 24 side) of the introduction portion 30. The diffusion portion 32 diffuses the working fluid in the directions that are perpendicular to the thickness direction of the opposite block 26, i.e., the directions in which the plurality of minute grooves 25 are separated from each other. The diffusion portion 32 supplies the working fluid to the plurality of throttle fluid paths 18 which will be described later.

The throttle fluid paths 18 are minute fluid paths for reducing pressure of the working fluid by restricting the flow rate of the working fluid. The throttle fluid paths 18 (minute grooves 25) linearly extend between the supply hole 16 and the discharge holes 20. It is preferable that the minute grooves 25 have a minimum depth of 1000 μm or less, in the fluid path from the supply hole 16 to the discharge holes 20.

The plurality of (three, in the illustrated embodiment) minute grooves 25 are formed on the grooved block 24. Thus, the throttle unit 14A has the plurality of (three, in the illustrated embodiment) throttle fluid paths 18 which are independent of each other. The plurality of throttle fluid paths 18 communicate with the single supply hole 16. That is, the throttle unit 14A has the single supply hole 16 which is commonly used for the plurality of throttle fluid paths 18.

The discharge holes 20 are formed in the grooved block 24. The discharge holes 20 penetrate through the opposite block 26 in the thickness direction. The throttle unit 14A has the same number of the discharge holes 20 as the throttle fluid paths 18. That is, the discharge holes 20, which are independent from each other, communicate with the respective throttle fluid paths 18. In the throttle unit 14A, accordingly, the working fluid supplied to the single supply hole 16 branches into the plurality of throttle fluid paths 18, and is discharged from the plurality of discharge holes 20. Then, the working fluid is supplied to the plurality of static pressure pockets formed in the bearing unit 12.

Next, the structure of the minute grooves 25, which are formed on the grooved block 24, is more specifically described. At least one surface of each of the minute grooves 25 is constituted by a curved surface or an inclined surface that is inclined with respect to the plane surface 15 of the grooved block 24. The cross section of the minute groove 25 has a shape such as a triangle, a trapezoid, a polygon (except for a substantial rectangle), an arc, or a combination thereof. Due to this feature, the groove depth as well as the groove width of the minute groove 25 can be measured by a general method in which the groove is observed from above with a microscope. The minute grooves 25 can be formed by machining or cutting a plane surface of a workpiece block made of metal.

Hereinafter, some patterns of a cross sectional shape of the minute groove 25 will be illustrated. In FIGS. 3A through 8B, respectively, figures indicated by references with a suffix "A" (e.g., 3A) show observational cases in which the minute groove 25 is observed from above (plan view), and figures indicated by references with a suffix "B" (e.g., 3B) are cross sectional views in which a cross sectional shape of the minute groove 25 is shown. In each of these figures, e.g., an area surrounded by a broken line V indicates a field of view when observed with a microscope.

Figure 3A:
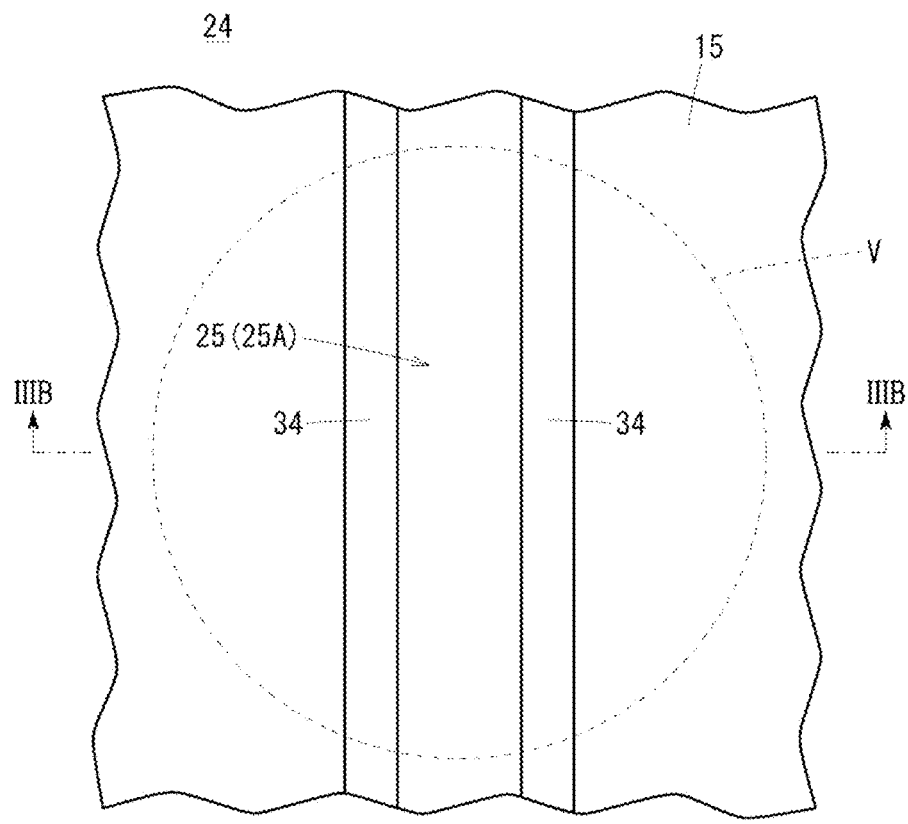
FIG. 3A is a plan view of a grooved block on which a minute groove is formed according to a first example.
Figure 3B:
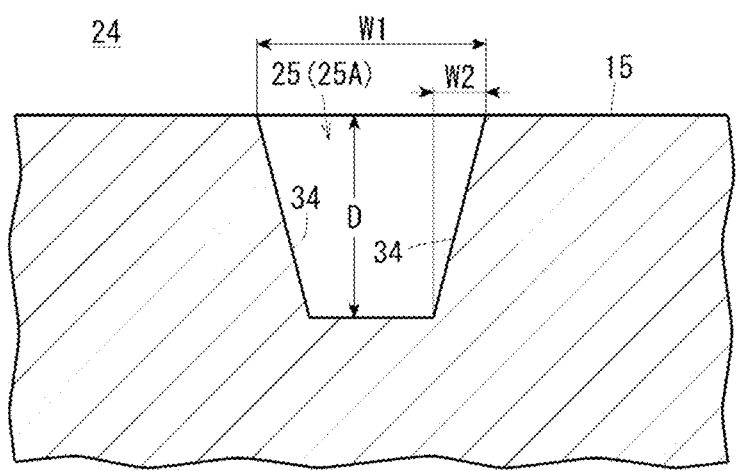
FIG. 3B is a cross sectional view taken along a line IIIB-IIIB in FIG. 3A.
Figure 4A:
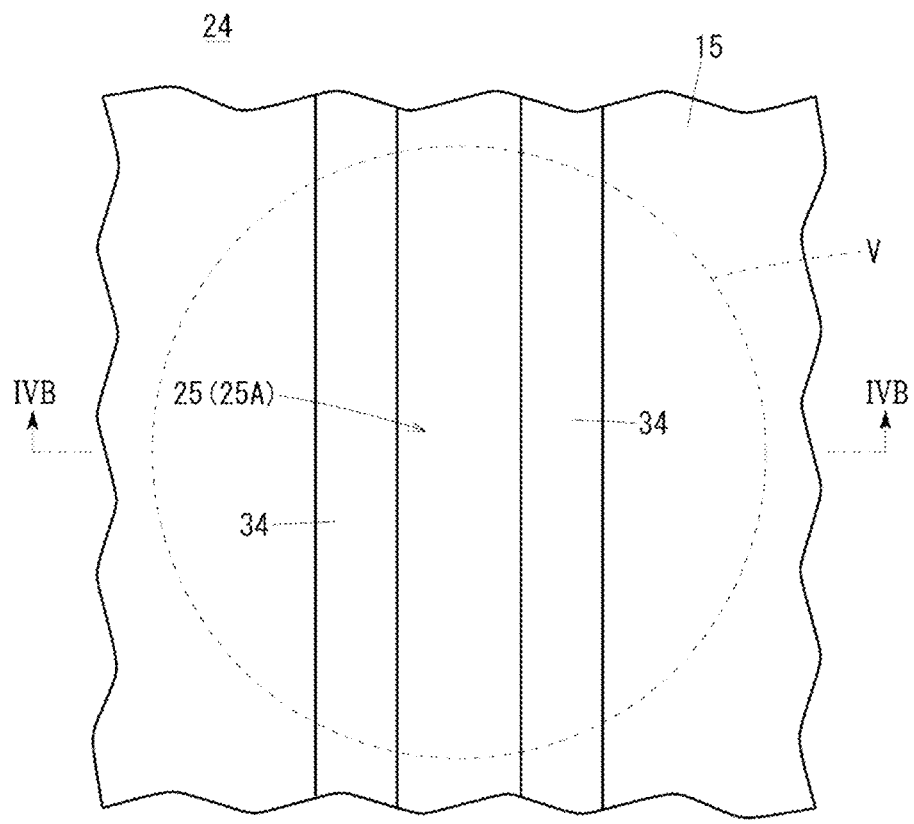
FIG. 4A is a plan view of a grooved block on which a minute groove is formed according to the first example, while the groove depth is deeper than that in FIG. 3A.
Figure 4B:
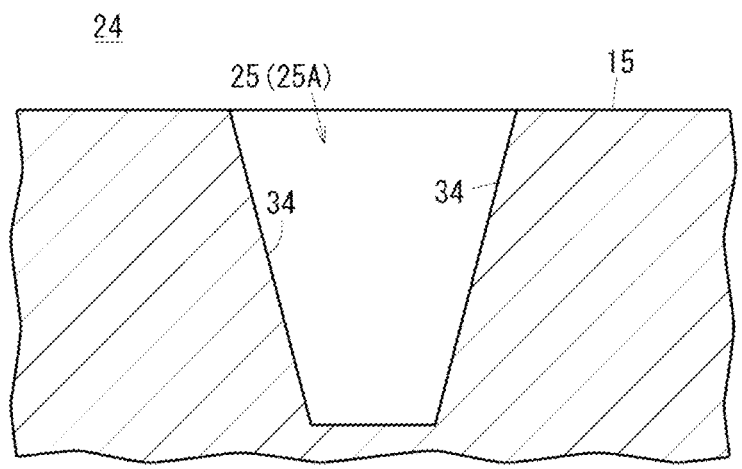
FIG. 4B is a cross sectional view taken along a line IVB-IVB in FIG. 4A.

In FIGS. 3A and 3B, a minute groove 25A, shown as one example (first example) of the minute groove 25, has a trapezoidal cross section. In the minute groove 25A, the width of a bottom surface, which corresponds to a lower base of the trapezoid, is smaller than the width of an opening (groove width), which corresponds to an upper base of the trapezoid. In the illustrated minute groove 25A, both side surfaces 34, which correspond to the two legs of the trapezoid, are inclined with respect to the thickness direction of the grooved block 24. In this case, either one of the side surfaces 34 of the minute groove 25A may be formed in parallel with the thickness direction of the grooved block 24. FIGS. 4A and 4B show a case in which the minute groove 25A having a trapezoidal cross sectional shape has been machined with a machine tool having the same shape, but the groove depth of the cross sectional shape becomes deeper than that of the minute groove 25A shown in FIGS. 3A and 3B, depending on the machine accuracy of the machine tool.

Figure 5A:
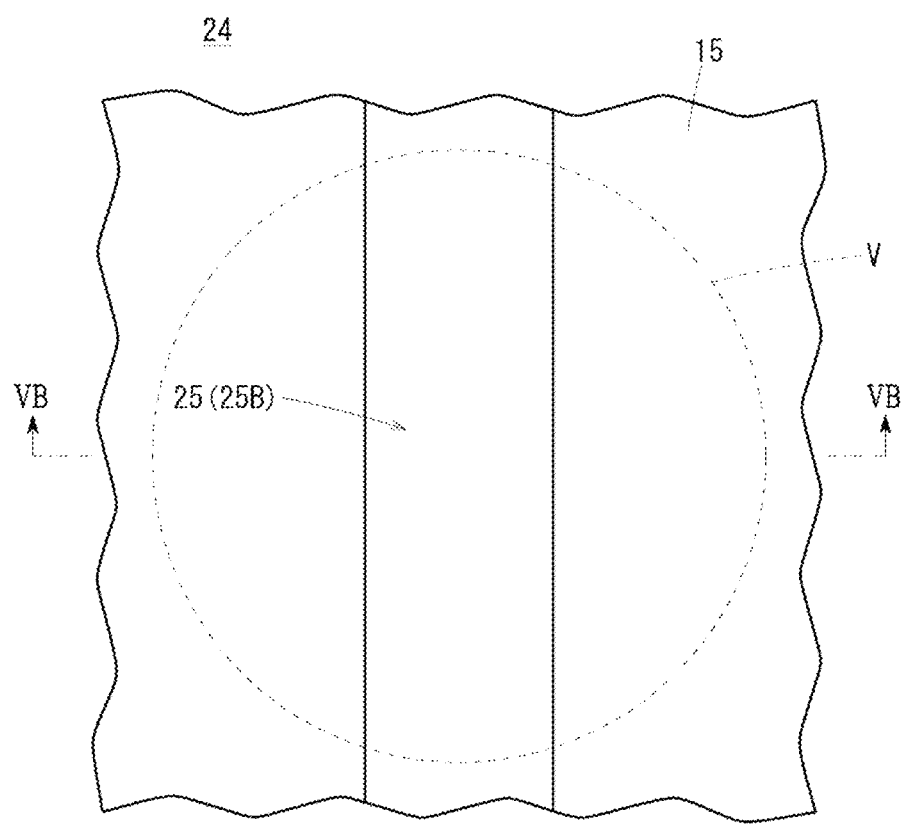
FIG. 5A is a plan view of a grooved block on which a minute groove is formed according to a second example.
Figure 5B:
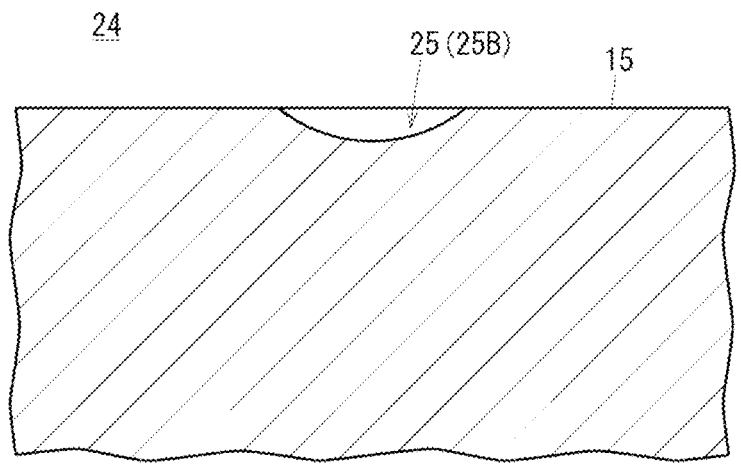
FIG. 5B is a cross sectional view taken along a line VB-VB in FIG. 5A.
Figure 6A:
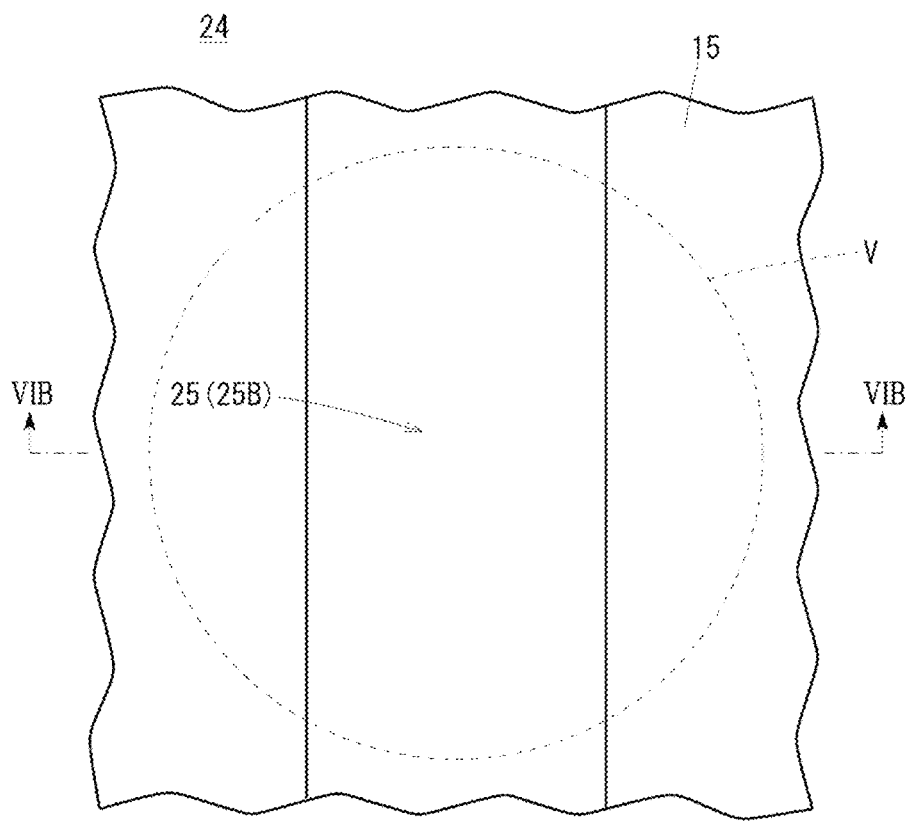
FIG. 6A is a plan view of a grooved block on which a minute groove is formed according to the second example, while the groove depth is deeper than that in FIG. 5A.
Figure 6B:
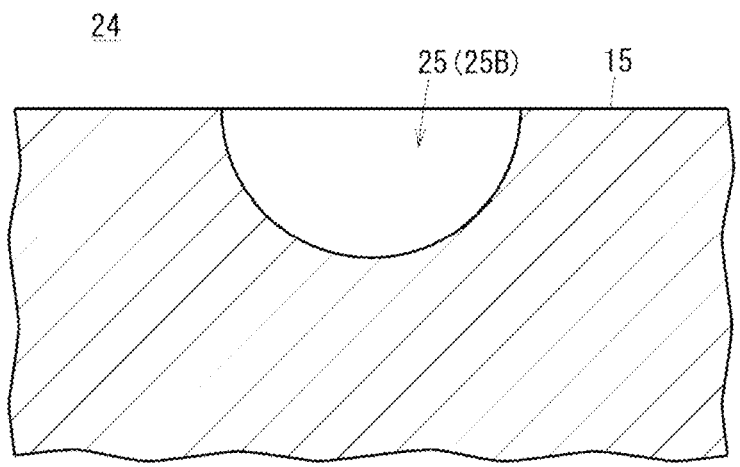
FIG. 6B is a cross sectional view taken along a line VIB-VIB in FIG. 6A.

In FIGS. 5A and 5B, a minute groove 25B, shown as another example (second example) of the minute groove 25, has an arcuate or circular cross section. FIGS. 6A and 6B show a case in which the minute groove 25B having an arcuate cross section has been machined with a machine tool having the same shape, but the groove depth of the cross sectional shape becomes deeper than that of the minute groove 25B shown in FIGS. 5A and 5B, depending on the machine accuracy of the machine tool.

Figure 7A:
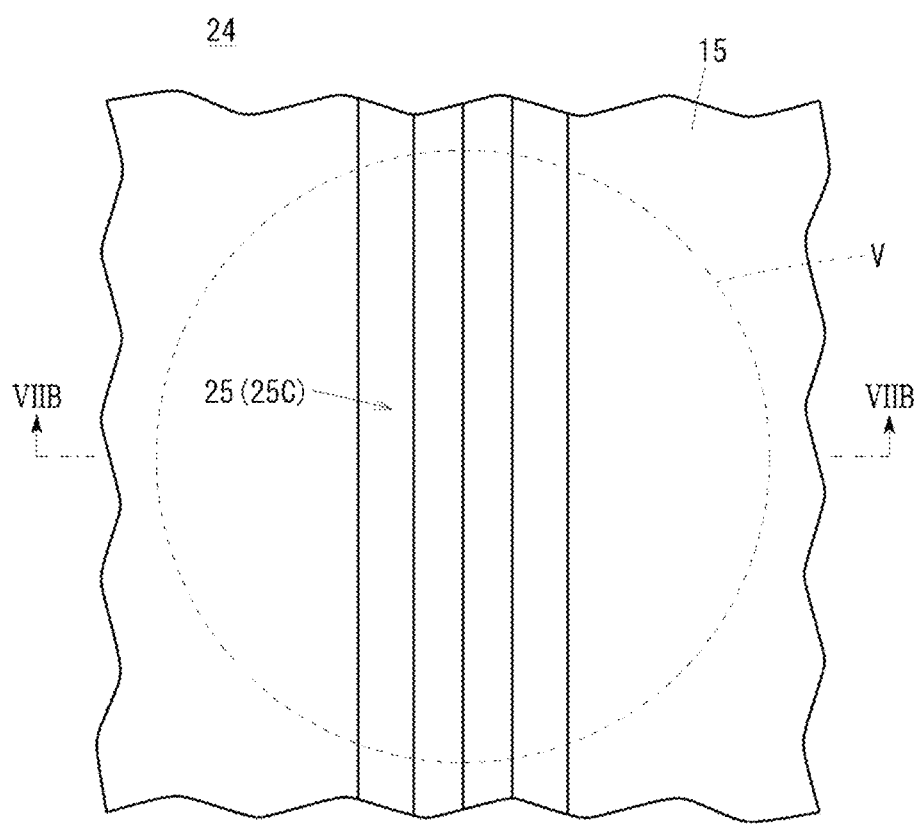
FIG. 7A is a plan view of a grooved block on which a minute groove is formed according to a third example.
Figure 7B:
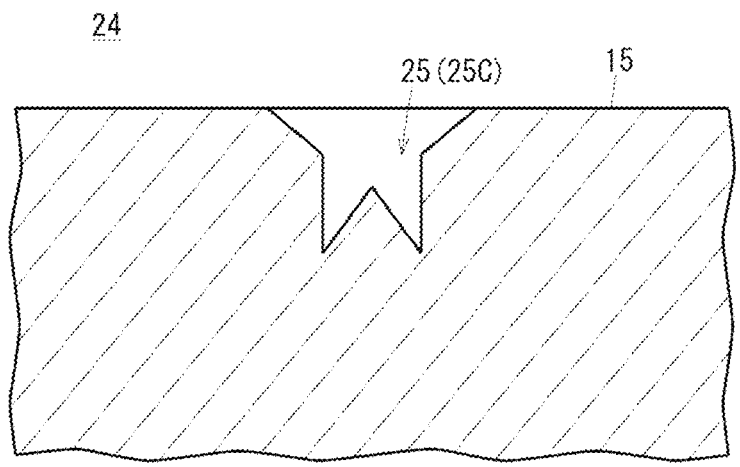
FIG. 7B is a cross sectional view taken along a line VIIB-VIIB in FIG. 7A.
Figure 8A:
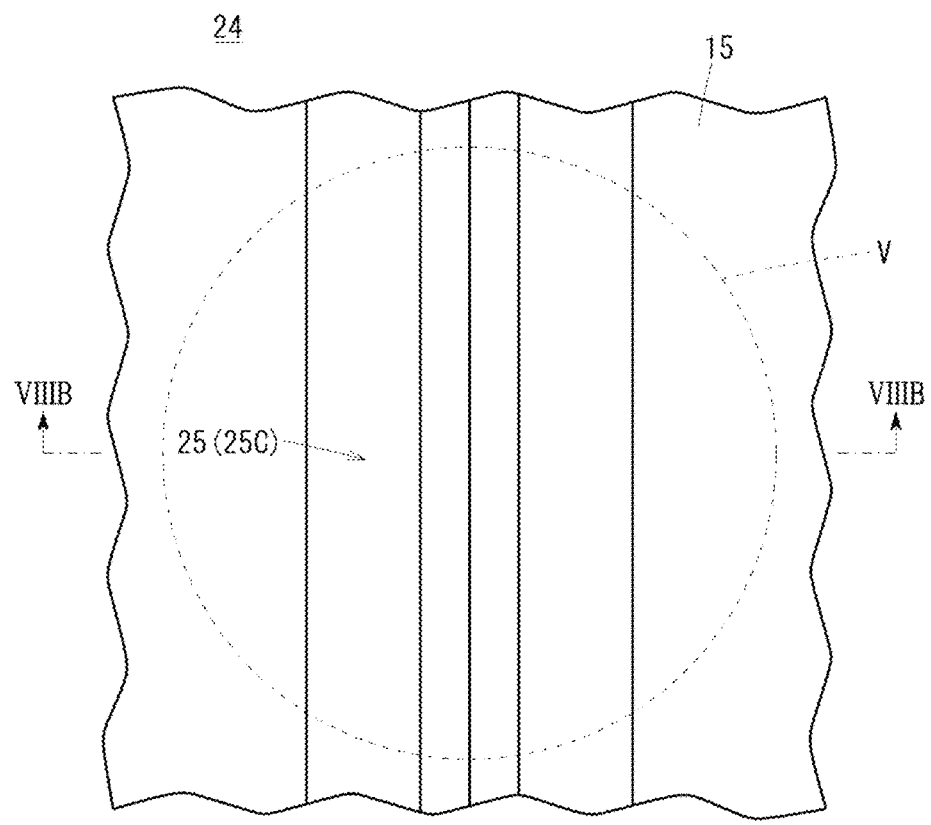
FIG. 8A is a plan view of a grooved block on which a minute groove is formed according to the third example, while the groove depth is deeper than that in FIG. 7A.
Figure 8B:
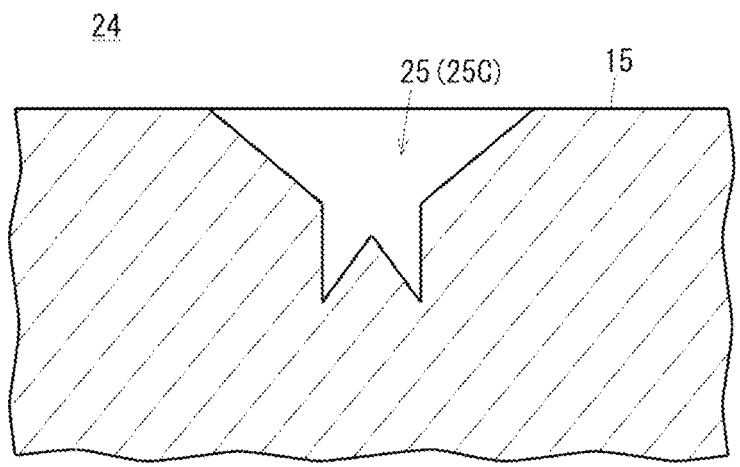
FIG. 8B is a cross sectional view taken along a line VIIIB-VIIIB in FIG. 8A.

In FIGS. 7A and 7B, a minute groove 25C, shown as still another example (third example) of the minute groove 25, has a polygonal cross section except for a substantial rectangular cross section. FIGS. 8A and 8B show a case in which the minute groove 25C having a polygonal cross section (except for a substantial rectangular cross section) has been machined with a machine tool having the same shape, but the groove depth of the cross sectional shape becomes deeper than that of the minute groove 25C shown in FIGS. 7A and 7B, depending on the machine accuracy of the machine tool.

In comparison between FIGS. 3A and 4A, between FIGS. 5A and 6A, and between FIGS. 7A and 8A, in which the minute groove 25 is observed from above, it is understood that the observed groove width is changed depending on the change in the groove depth, even if the groove is machined with the cutting tool having the same shape. That is, when the machine tool having the same shape is used, the deeper the groove depth is, the wider the groove width is.

With regard to the minute grooves 25A through 25C having these cross sectional shapes, since the shapes of the machine tools are known, the groove depth can be calculated from the groove width. For example, as to the minute groove 25A having a trapezoidal cross section (see FIG. 3B), the groove depth D can be calculated based on the groove width W1. Otherwise, as to the minute groove 25A, the groove depth D can be calculated based on the width W2 of the inclined surface (the width of inclined side surface 34 as observed from above). Regarding other minute grooves 25 having respective cross sectional shapes as well, the groove depth can be calculated based on the groove width or the width of a portion that is part of the surface of the minute groove 25 and varies based on the groove depth.

As described above, in the throttle unit 14A, at least one surface of the minute groove 25 is constituted by a curved surface or an inclined surface that is inclined with respect to the plane surface 15 of the grooved block 24. The cross section of the minute groove 25 has a shape such as a triangle, a trapezoid, a polygon (except for a substantial rectangle), an arc, or a combination thereof. Thus, due to this feature, the groove depth as well as the groove width of the minute groove 25 can be measured by a general method in which the minute groove 25 is observed from above (in the direction that is perpendicular to the plane surface 15) with a microscope. Since the groove depth of the minute groove 25 can be measured, more precise machining can be achieved by correcting the machining device (thermal displacement correction or the like) based on the machining result, and a precise groove shape can be obtained.

In this manner, the manufacturing method of the grooved block 24 includes a cutting step, a calculating step, and a correcting step. In the cutting step, the plane surface of a workpiece block is cut to form the minute groove 25, and at least one surface of the minute groove 25 is constituted by a curved surface or an inclined surface that is inclined with respect to the plane surface of the workpiece block. In the calculating step, the minute groove 25 that has been formed in the cutting step is observed with a microscope in the direction perpendicular to the surface of the workpiece block (grooved block 24), and the groove depth of the observed minute groove 25 is calculated. In the correcting step, a machining device that performs the cutting is corrected, based on the groove depth calculated in the calculating step.

In the aforementioned Japanese Laid-Open Patent Publication No. 2006-266358, since a total length of a fluid path is increased by connecting a plurality of linear minute grooves that extend in different directions from each other, corners (bent portions) of the minute grooves tend to be clogged with foreign material. In contrast, the throttle unit 14A according to the present embodiment, preferable restriction strength can be obtained even if the cross sectional shape of the throttle fluid path 18 is small and a fluid path length of the throttle fluid path 18 is short. Thus, the throttle fluid path 18 can be made linear, i.e., simply extend from the supply hole 16 to the discharge hole 20 linearly. Accordingly, the minute groove 25 can be manufactured (by cutting) easily, and it is possible to suppress clogging with the foreign material in the minute groove 25.

Further, in the throttle unit 14A, the plurality of throttle fluid paths 18 communicate with the single supply hole 16, and the discharge holes 20, which are independent from each other, communicate with the respective throttle fluid paths 18. The working fluid that is supplied to the single supply hole 16 branches into the plurality of throttle fluid paths 18, and is discharged from the plurality of discharge holes 20. With this feature, the number of throttle units 14A that are provided in the static pressure bearing device 10A can be reduced. Thus, it is possible to lower the cost, simplify the structure, and omit some piping. Accordingly, since additional parts for changing restriction strength are unnecessary, it is possible to minimize the number of parts, the portions to be sealed, and piping. Further, the structure is simple, and the man hours for machining and assembling are small. Also, individual differences in the restriction strength are small, the cost is lowered, and it is easy to clean the unit.

Therefore, by installing the throttle unit 14A, it is possible to reduce the weight of parts, realize compact structure, reduce the cost by decreasing the number of parts and manufacturing steps, achieve high reliability, and improve maintainability by easy disassembly and cleaning.

In the meantime, the minute groove 25 can adopt a simple linear shape, and thus it is possible to suppress clogging with the foreign material. However, on the other hand it is impossible to completely avoid the clogging with foreign material depending on the cleanliness of supplied working fluid, also in view of the smallness of the cross sectional shape of the throttle fluid path 18 (minute groove 25). Thus, it is necessary to confirm the location of foreign material and remove it at the time of disassembling and cleaning operations for the device.

Figure 9A:
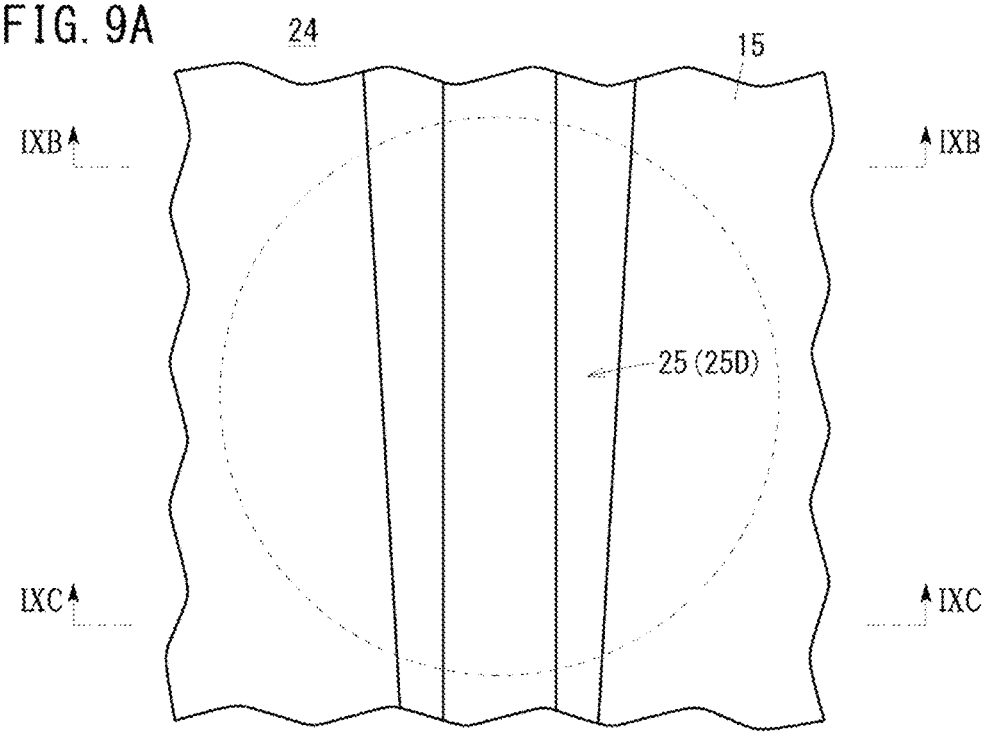
FIG. 9A is a plan view of a grooved block on which a minute groove is formed according to a fourth example.
Figure 9B:
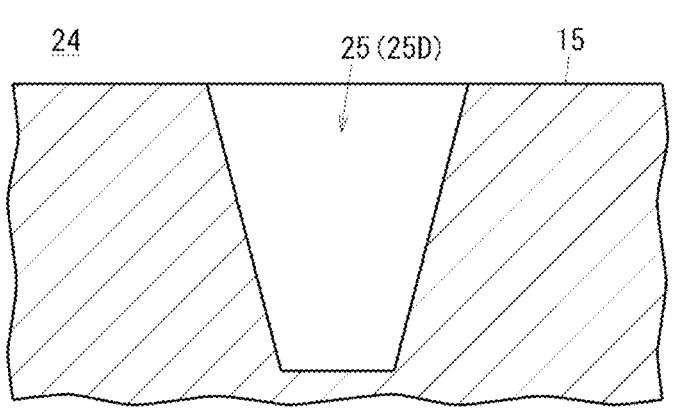
FIG. 9B is a cross sectional view taken along a line IXB-IXB in FIG. 9A.
Figure 9C:
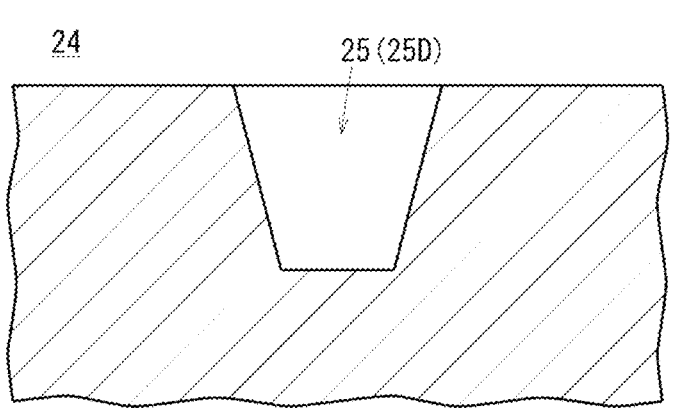
FIG. 9C is a cross sectional view taken along a line IXC-IXC in FIG. 9A.

In FIGS. 9A through 9C, a minute groove 25D, shown as still another example (fourth example) of the minute groove 25, has continuously-changed groove width and groove depth at least partially in its overall length (from the supply hole 16 to the discharge hole 20). The groove width and the groove depth of the minute groove 25D may be continuously changed over its overall length. In FIGS. 9A through 9C, the minute groove 25D having a trapezoidal cross section is illustrated. More specifically, as shown in FIG. 9A, the groove width of the minute groove 25D is continuously changed in the longitudinal direction of the minute groove 25D. In FIGS. 9B and 9C, sizes of a cross sectional shape (groove width and groove depth) are different at different positions.

The cross sectional shape of the minute groove 25D, the groove width and the groove depth of which are continuously changed, may have an arcuate cross section in a similar manner to the minute groove 25B shown in FIGS. 5A through 6B. Alternatively, it may have a polygonal cross section except for a substantial rectangular cross section in a similar manner to the minute groove 25C shown in FIGS. 7A through 8B.

When the above-described minute groove 25D having continuously-changed groove width and groove depth is adopted, even if the foreign material somewhat clogs the minute groove 25D, it is possible to easily gather foreign material at a portion having a small cross sectional shape of the minute groove 25D. Thus, the portion clogged with foreign material is easily confirmed at the time of cleaning operation for the disassembled device, and the foreign material can be removed efficiently.

Figure 10A:
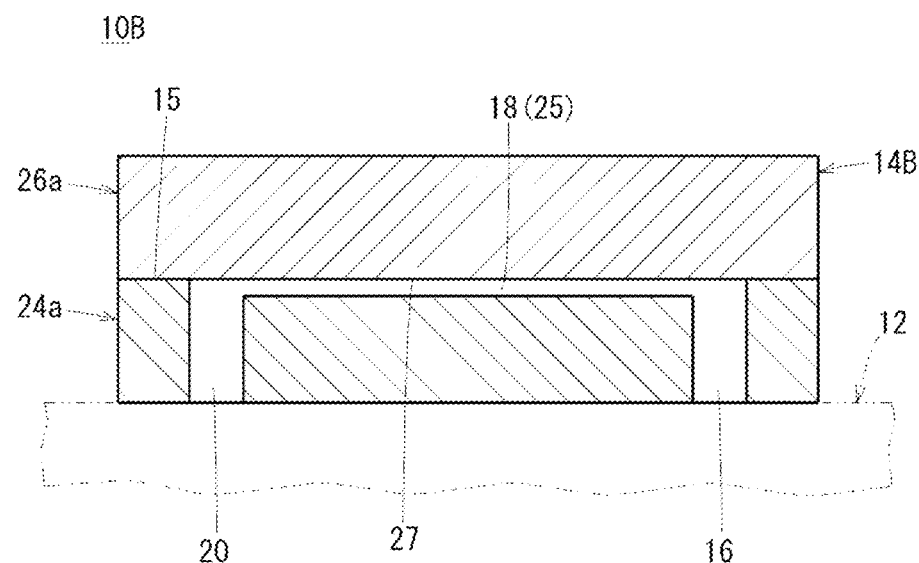
FIG. 10A is a schematic cross sectional view of a static pressure bearing device according to another embodiment of the present invention.
Figure 10B:
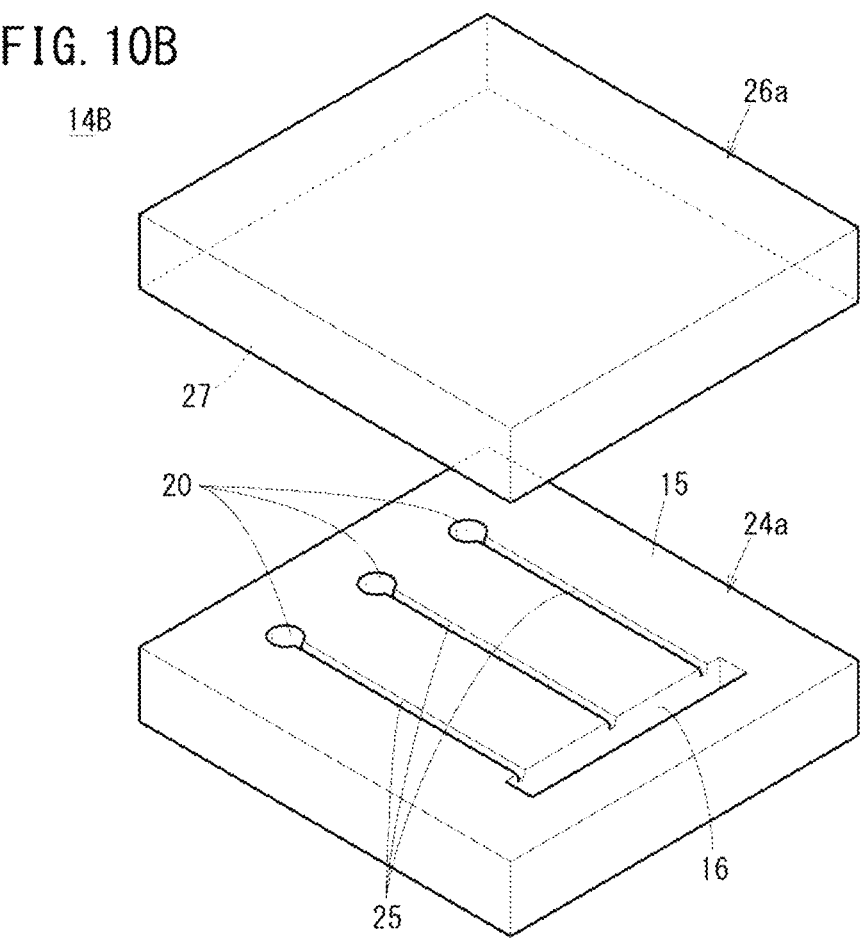
FIG. 10B is an exploded perspective view of a throttle unit of the static pressure bearing device shown in FIG. 10A.

A throttle unit 14B shown in FIGS. 10A and 10B is equipped with a grooved block 24a and an opposite block 26a. The grooved block 24a includes a plane surface, a supply hole 16, minute grooves 25, and discharge holes 20. The opposite block 26a includes a plane surface 27 that is opposite to the minute grooves 25. That is, the throttle unit 14B corresponds to the aforementioned throttle unit 14A, though the supply hole 16 is formed in the grooved block 24 instead of the opposite block 26. The respective minute grooves 25 can be any of the aforementioned minute grooves 25A through 25D. The static pressure bearing device 10B shown in FIG. 10B is equipped with a bearing unit 12, and the throttle unit 14B that is detachably attached to the bearing unit 12. With the throttle unit 14B constituted as above, the same advantageous effects as those according to the aforementioned throttle unit 14A can be obtained.

Figure 11:
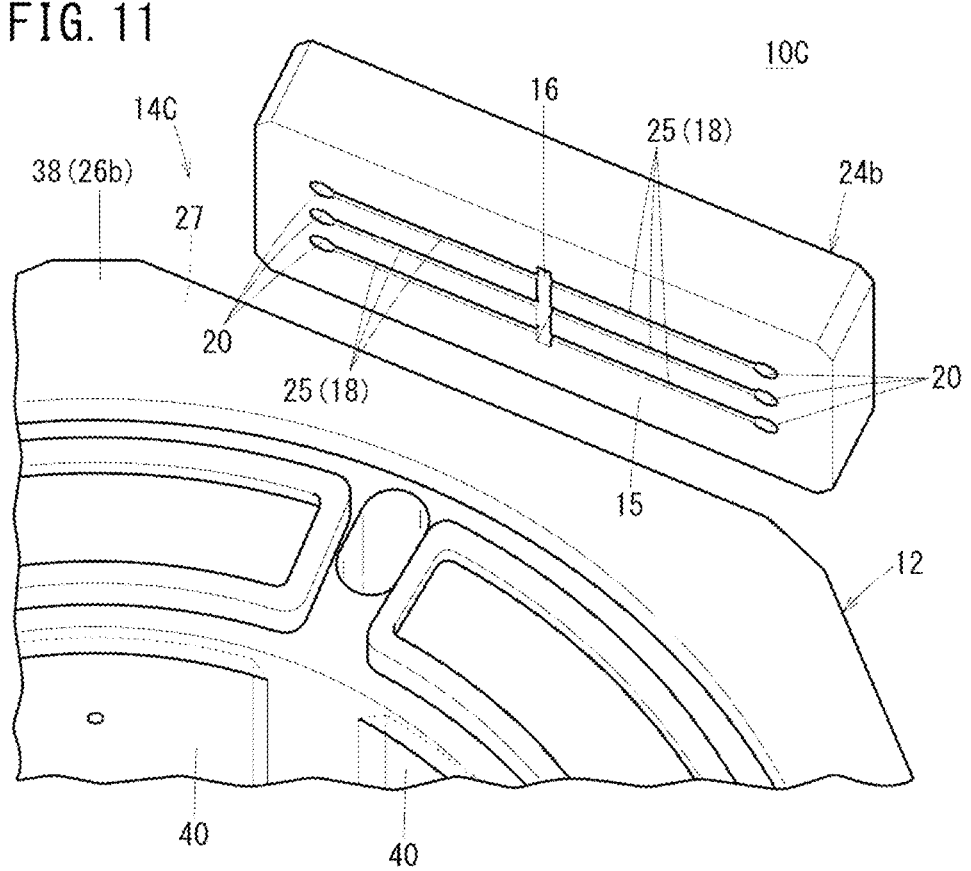
FIG. 11 is an exploded perspective view of a static pressure bearing device according to still another embodiment of the present invention.

A static pressure bearing device 10C shown in FIG. 11 is equipped with a bearing unit 12, and a grooved block 24b detachably attached to the bearing unit 12. FIG. 11 shows a state in which the grooved block 24b is detached from the bearing unit 12. The bearing unit 12 has a guide 38 as a fixed portion and a slide (not shown) as a movable portion. The guide 38 is provided with a plurality of static pressure pockets 40.

The guide 38 has the plane surface 27 that is opposite to the plurality of minute grooves 25 formed in the grooved block 24b, in a state in which the grooved block 24b is attached (fixed) to the bearing unit 12. In the state in which the grooved block 24b is attached (fixed) to the bearing unit 12, a plurality of throttle fluid paths 18 are formed by the plurality of minute grooves 25 and the plane surface 27. Thus, a component of the guide 38 of the bearing unit 12 also functions as an opposite block 26b that has the plane surface 27 opposite to the plurality of minute grooves 25. The plurality of static pressure pockets 40 may be formed on the slide which is a movable portion.

A single supply hole 16, the plurality of (six, in the illustrated embodiment) minute grooves 25 which communicate with the single supply hole 16, and the plurality of discharge holes 20 which communicate with the respective minute grooves 25, are formed in the grooved block 24b. The minute grooves 25 can be any of the aforementioned minute grooves 25A through 25D.

Figure 12:
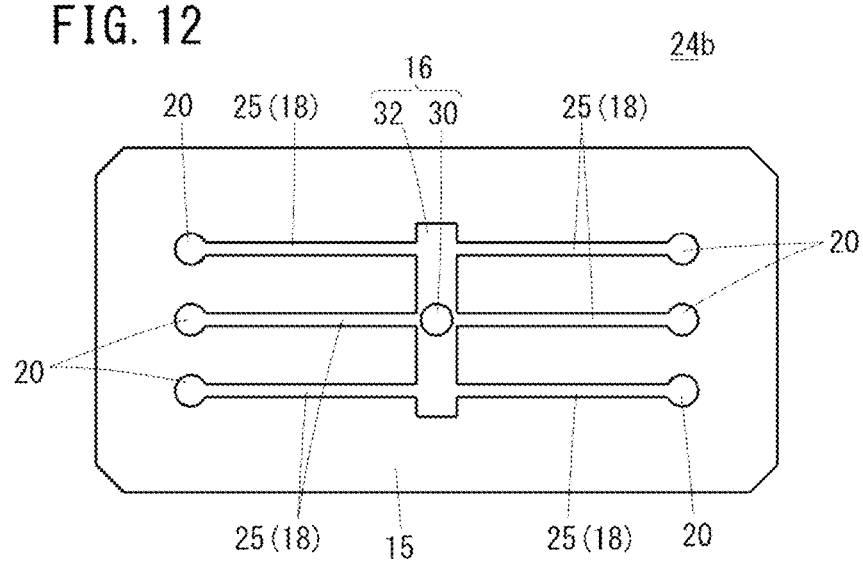
FIG. 12 is a front view of a grooved block of the static pressure bearing device shown in FIG. 11.

As shown in FIG. 12, each of the minute grooves 25 linearly extend from the supply hole 16 to the discharge holes 20. The two minute grooves 25 are arranged on the same line through the supply hole 16. A plurality of (three, in the illustrated embodiment) pairs of the two minute grooves 25 arranged on the same line are provided. The plurality of minute grooves 25 (throttle fluid paths 18) communicate with the single supply hole 16. The working fluid supplied to the single supply hole 16 branches into the plurality of throttle fluid paths 18, and is discharged from the plurality of discharge holes 20.

As shown in FIG. 11, a throttle unit 14C is constituted by the grooved block 24b as configured above, and the opposite block 26b which also functions as a component of the guide 38. Thus, the throttle unit 14C can be constituted only by attaching the grooved block 24b to the guide 38 that has the plane surface 27 and is a static pressure bearing component.

In this case, the grooved block 24b may function as a component of the guide. Otherwise, the grooved block 24b or the opposite block 26b may function as a component of the slide of the bearing unit 12 or a component of another throttle unit.

With the throttle unit 14C, the same advantageous effects as those according to the aforementioned throttle unit 14A can be obtained. Further, according to the throttle unit 14C, at the time of machining the minute grooves 25, one groove-forming operation from one side of the supply hole 16 to the other side gives grooves divided by the supply hole 16 such that the grooves can be used as the independent minute grooves 25. Since the plurality of minute grooves 25 are formed in a single machining path, it is possible to reduce man hours for the machining.

Further, since the grooved block 24b or the opposite block 26b functions as a component of the slide (slide component), or a component of the guide (guide component), or a component of another throttle unit (another throttle unit component), the throttle unit 14C can substantially be configured by a single component. In accordance with this feature, it is expected that the structure is simplified, the number of parts is reduced, the installation space is saved, and some piping is omitted.

The present invention is not limited to the embodiment described above, and various modifications can be made to the invention without deviating from the essential scope of the present invention as set forth in the appended claims.

What is claimed is:

1. A method of manufacturing a grooved block that includes a plane surface and at least one groove on the plane surface, wherein the grooved block is a component of a throttle unit, in which a working fluid is introduced from at least one supply hole, the introduced working fluid flows in a throttle fluid path, and the working fluid which has passed through the throttle fluid path is discharged from at least one discharge hole,
wherein the throttle unit comprises the grooved block and an opposite block including a plane surface that is opposite to the at least one groove, the grooved block and the opposite block are plate-shaped and opposite to each other and joined to each other, and the at least one throttle fluid path is formed by the at least one groove and the plane surface of the opposite block,
the method comprising:
a cutting of cutting a plane surface of a workpiece block to form the groove, at least one surface of the groove being constituted by a curved surface or a inclined surface that is inclined with respect to the plane surface of the workpiece block;
a depth calculating of calculating a groove depth of the groove that has been formed in the cutting, observing the groove with a microscope from a direction perpendicular to the plane surface of the workpiece block; and
a correcting of making a correction of a machining device that performs the cutting, based on the calculated groove depth.

2. The method according to claim 1, wherein
the calculating comprises calculating the groove depth based on
a shape of a machine tool used by the machining device in the cutting, or
a width of the inclined surface.

3. The method according to claim 1, wherein
the cutting comprises cutting the plane surface of the workpiece block to form the groove having the at least one surface being constituted by the inclined surface, and
the calculating comprises calculating the groove depth based on a width of the inclined surface.

4. The method according to claim 1, wherein
the cutting comprises cutting the plane surface of the workpiece block to form a single supply hole and a plurality of grooves linearly extending from the single supply hole to the at least one discharge hole.

5. The method according to claim 1, wherein
the cutting comprises cutting the plane surface of the workpiece block to form a single supply hole and a plurality of grooves arranged on a same line through the single supply hole.

6. The method according to claim 1, wherein
the cutting comprises cutting the plane surface of the workpiece block to form
a single supply hole,
a plurality of throttle fluid paths connected to the single supply hole, and a plurality of discharge holes, which are independent from each other, and communicate with the plurality of throttle fluid paths.

7. The method according to claim 1, wherein the cutting comprises cutting the plane surface of the workpiece block in a single machining path to form a plurality of grooves.

8. The method according to claim 1, wherein the cutting comprises cutting the plane surface of the workpiece block to form a plurality of grooves, at least one of the plurality of grooves has continuously-changed width and depth at least partially in its overall length.

9. The method according to claim 1, wherein the cutting comprises cutting the plane surface of the workpiece block to form the at least one groove having a groove depth of 1000 μm or less from the at least one supply hole to the at least one discharge hole.

10. The method according to claim 1, wherein the cutting comprises cutting the plane surface of the workpiece block to form the at least one groove having a trapezoidal shape, which is the same as a shape of a machine tool used by the machining device to perform the cutting.

11. The method according to claim 1, wherein the cutting comprises cutting the plane surface of the workpiece block to form the at least one groove having an arcuate or circular shape, which is the same as a shape of a machine tool used by the machining device to perform the cutting.

\* \* \* \* \*